US009031879B2

(12) United States Patent
Chatte

(10) Patent No.: US 9,031,879 B2
(45) Date of Patent: May 12, 2015

(54) METHOD OF FRANKING WITH EARLY SIGNATURE GENERATION

(75) Inventor: Fabien Chatte, Nogent sur Marne (FR)

(73) Assignee: Neopost Technologies, Bagneux (FR)

(*) Notice: Subject to any disclaimer, the term of this patent is extended or adjusted under 35 U.S.C. 154(b) by 998 days.

(21) Appl. No.: 11/866,007

(22) Filed: Oct. 2, 2007

(65) Prior Publication Data

US 2008/0103979 A1 May 1, 2008

(30) Foreign Application Priority Data

Oct. 31, 2006 (FR) ..................................... 06 54650

(51) Int. Cl.
*G06F 17/00* (2006.01)
*G07B 17/00* (2006.01)

(52) U.S. Cl.
CPC ...... *G07B 17/0008* (2013.01); *G07B 17/00661* (2013.01); *G07B 2017/0058* (2013.01); *G07B 2017/00766* (2013.01)

(58) Field of Classification Search
USPC .......................................................... 705/401
See application file for complete search history.

(56) References Cited

U.S. PATENT DOCUMENTS

| | | | | |
|---|---|---|---|---|
| 6,438,529 | B1 * | 8/2002 | Thiel | 705/62 |
| 6,585,433 | B2 * | 7/2003 | Davies et al. | 400/70 |
| 2003/0035148 | A1 * | 2/2003 | Patton et al. | 358/3.28 |
| 2005/0080749 | A1 * | 4/2005 | Kummer et al. | 705/400 |

FOREIGN PATENT DOCUMENTS

WO 00/65541 A1 11/2000

OTHER PUBLICATIONS

ICSA Guide to Cryptography, Randall K. Nichols, pp. 330-331.*

* cited by examiner

*Primary Examiner* — Tsan-Yu J Huang
(74) *Attorney, Agent, or Firm* — Sughrue Mion, PLLC

(57) ABSTRACT

A method of generating a digital signature at a postage meter, in which method a postal imprint is printed on a mail item once said mail item has been weighed and once its postage amount has been determined, said postal imprint being associated with a digital signature generated by means of a secret key on the basis of constant data and variable data, said variable data comprising only a fingerprint code extracted upstream of the weighing from a three-dimensional structure of the fibers of the mail item.

3 Claims, 1 Drawing Sheet

METHOD OF FRANKING WITH EARLY SIGNATURE GENERATION

FIELD OF THE INVENTION

The present invention relates to the specific field of mail handling. It relates more particularly to a postage meter or "franking machine" making it possible to achieve high printing throughputs by obtaining a digital signature early.

PRIOR ART

Today, when a postage meter is to process mail items having different weights, formats, or services (such mail items being referred to as "mixed mail"), said postage meter is, in general, limited as regards printing throughput. It is known that postal authorities require the postal imprint printed on the mail item to bear a digital signature. In order to increase security, increasingly large numbers of items of signed data are required, including, in particular: the serial number of the postage meter, the format and the weight of the mail item, the date and the postage amount or "franking amount", the requested services, etc. And the signature cannot be computed until all of the data has been transmitted to the postal security device (PSD) of the postage meter. Some of said data items are constant (e.g. the serial number of the postage meter), and others are variable (e.g. format or requested service), and, among the variable items of data, some are obtained very late in the process, i.e. just before the postal imprint is printed, such as the weight of the mail item that is obtained only once the mail item has been extracted from the weigh-on-the-fly module that conventionally precedes the print module, which delays computing of the signature and thus significantly influences the printing throughput of the mail items.

Once the weight data is obtained, the PSD must compute the signature, and that computation requires at least 120 milliseconds (ms) to which 50 ms needs to be added for building up the imprint, which, for a conveying speed of 4 meters per second (m/s) requires a gap of nearly 70 centimeters (cm) to be left between the outlet of the weigh-on-the-fly module and the print module. Unfortunately, such a gap is unacceptable in current postage meters, where such a gap does not exceed 15 cm, and where the length of the conveyor device is a major factor in increasing the cost of a postage meter.

Patent document U.S. Pat. No. 6,499,020 proposes a solution to that problem by acting on the profile of the conveying speed at which the mail items are conveyed to the print zone. Patent Document U.S. Pat. No. 6,595,412 proposes another approach by limiting the time required for computing the signature by pre-computing said signature on the basis of the constant or nearly constant items of data that go to make it up.

However, although both of those solutions improve printing throughputs, that improvement remains limited and does not make it possible to process mail items at throughputs of about 15,000 envelopes per hour or higher.

OBJECT AND DEFINITION OF THE INVENTION

The invention proposes to mitigate that drawback with a postage meter implementing a method of generating a signature early, thereby making it possible to process envelopes on the fly at particularly high throughputs, in particular at higher than 15,000 envelopes per hour. An object of the invention is also to make such processing possible without making major structural changes to the postage meter.

These objects are achieved by a method of generating a digital signature at a postage meter, in which method a postal imprint is printed on a mail item once said mail item has been weighed and once its postage amount has been determined, said postal imprint being associated with a digital signature generated by means of a secret key on the basis of constant data and variable data, wherein said variable data comprises only a fingerprint code extracted upstream of the weighing from a three-dimensional structure of the fibers of the mail item.

Thus, with the digital signature being previously determined not later than on entry into the weigh module, it is possible to obtain particularly high printing throughputs, typically about 15,000 envelopes per hour or higher.

Preferably, said constant data includes at least one serial number of said postage meter.

Advantageously, said postal imprint is printed in the form of a two-dimensional bar code including said digital signature.

The invention also provides a postage meter for printing a postal imprint, said postage meter comprising at least a feeder module, a dynamic weigh module, and a print module incorporating a postal security device, said postage meter further comprising a scanner device for scanning the three-dimensional structure of the fibers of each mail item, and wherein said postal security device includes means for generating a digital signature on the basis of a fingerprint code extracted from said three-dimensional structure of the fibers of the mail item by means of said scanner device.

Preferably, said scanner device for scanning the three-dimensional structure of the fibers of each mail item is incorporated into said feeder module, and said postal imprint is printed in the form of a two-dimensional bar code including said digital signature.

BRIEF DESCRIPTION OF THE DRAWINGS

Other characteristics and advantages of the present invention appear more clearly from the following description given by way of non-limiting indication, with reference to the accompanying drawing, in which.

DETAILED DESCRIPTION OF A PREFERRED IMPLEMENTATION

The invention is based, during the franking process, on early computation of the digital signature which, instead of being computed after the mail item has been weighed, is computed prior said mail item being weighed, i.e. as soon as said mail item exits from the feeder. However, at that point, only the constant data for the postal imprint is available, and computing a signature merely on the basis of that constant data would make the franking process particularly vulnerable to any attack from an ill-intentioned person. That is why the inventors have imagined using the three-dimensional structure of the fibers of the mail item to add to said constant data an item of data that is of eminently variable type and that is guaranteed to be available a long way upstream of the print module. Thus, security is guaranteed or even strengthened, and the digital signature that can be computed on exit from the feeder module, so that the distance between the weigh module and the print module no longer constitutes a factor limiting printing throughputs.

Figure 1:
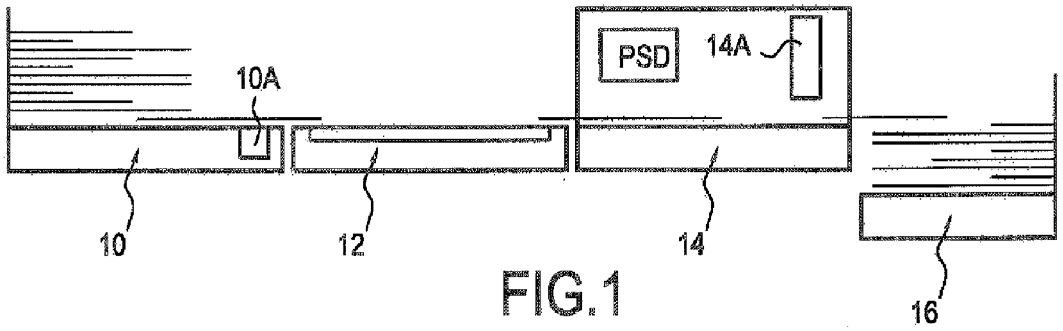
FIG. 1 is a highly diagrammatic view of a postage meter modified in accordance with the invention.
Figure 2:
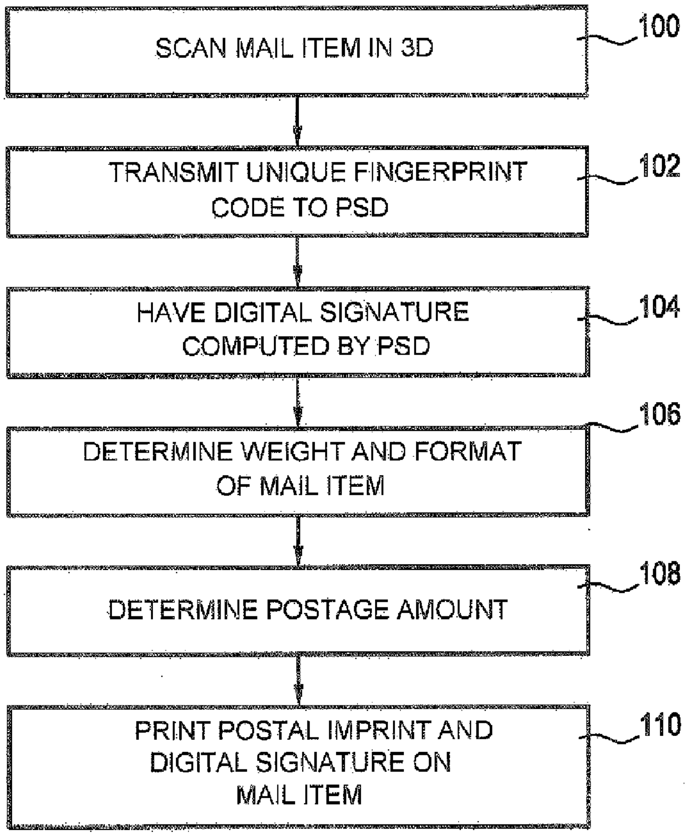
FIG. 2 shows the franking method including the signature generation method implemented in the postage meter of FIG. 1.

FIG. 1 is highly diagrammatical and shows the various components of a postage meter with, disposed from upstream to downstream relative to the direction of advance of the mail items, a feeder module for feeding in mail items 10, a dynamic weigh module (also known as a “weigh-on-the-fly” module) 12, a franking module 14 with its print head 14A and conventionally provided with a postal security device (PSD), and a storage module 16 for storing the franked mailed items.

Such a postage meter can frank mail items of different formats, from the US format No. 5 (76.2 millimeters (mm)× 127 mm) to the European B4 format (250 mm×353 mm), and including the European C6/5 format (114 mm×229 mm), to a determined thickness, e.g. 16 mm, corresponding to the height of the slot through which the mail items are inserted into the franking module.

In the invention, the feeder module is provided with a scanner device 10A for scanning the three-dimensional (3D) structure of the fibers of the paper of which the mail item is made. Said three-dimensional fiber structure, which constitutes a sort of digital “fingerprint” of the paper, is unique (with a probability of $10^{-150}$ of finding 2 identical codes) and different for each mail item, even when the mail items are made from the same ream of paper. Such a scanner device that allows processing to take place at a speed of 20 m/s is, for example, available from Ingenia Technology, an English company.

There follows a description follows of the franking process implemented in such a device. With the mail items being disposed in the feeder module 10, a first mail item is three-dimensionally scanned in a first step 100, then the fingerprint code extracted from the scanned 3D structure is transmitted to the PSD of the postage meter in a step 102, then, by means of a secret key stored in known manner in the PSD, the PSD computes the signature in a step 104 on the basis of said unique code and optionally of constant data known to the PSD, such as the serial number of the postage meter, the franking date (constant for a given session), etc.

In parallel, in a step 106, the mail item that has left the feeder module 10 for the dynamic weigh module 12 is weighed on the fly and, if necessary, its format is determined (depending on the postal standard in question) so that the postage amount can be determined in the next step 108 on the basis of said data and of data relating to the service(s) requested by the sender and input previously. However, said variable data, which is often different for each mail item (at least for two distinct batches) is not taken into account for computing the signature unlike known current practice. Such data would not procure any further security for generating the signature and would merely delay its generation.

It then merely remains, in a step 110, at the print module 14, to print the postal imprint and the digital signature as generated previously in step 104.

Thus, by computing the digital signature early as of the feeder module, rather than waiting for the mail item to exit from the dynamic weigh module, 120 ms are saved, i.e. nearly 48 cm are saved at a speed of 4 m/s. In addition, by using a fingerprint code that is, by principle, unique, instead of a multitude of items of information, the overall security of the system is improved.

It should be noted that although reference is made to finally printing a postal imprint (in step 110), it is naturally to be understood that printing a two-dimensional bar code is also quite possible, subject to having previously computed it on the basis of the data that served for printing said postal imprint. It should also be noted that such a 2D code can then validly incorporate the digital signature.

The process of verifying the mail item is as follows. At the mail collection office, the postal authority employee who receives the mail item firstly checks the collected mail in the usual way, in particular by verifying the postage amount relative to the format, weight, and requested service(s). But said employee can also make sure that the postal imprint is authentic by decrypting the digital signature with the master key so as to extract therefrom the fingerprint code that it encloses, and by comparing the decrypted code with the code extracted from the collected mail item by means of a 3D scanner device analogous to the device that served during the process of sending said mail item.

If the postal imprint has been counterfeited by photocopying onto a mail item other than the original mail item, the code extracted from the 3D scan is different from the decrypted code because the two mail items have distinct paper fiber structures. Even if counterfeiters have their own 3D scanner device, the fact that they do not know the secret key of an authorized PSD leads to an erroneous signature being created whose decryption by the postal authority will not enable a valid comparison to be obtained.

Thus, in accordance with the invention, merely inserting a scanner device for scanning the three-dimensional structures of the fibers of the mail items at the feeder module of the postage meter, thereby enabling a signature to be generated early, suffices to make it possible to obtain very high printing throughputs without in any way limiting the security of the postage meter equipped in this way, but rather while improving said security.

What is claimed is:

1. A postage meter for printing postal imprints on mixed mail items, said postage meter comprising:

at least a feeder module, a dynamic weigh module, a print module incorporating a postal security device, and a scanner device for scanning the three-dimensional structure of fibers of each mail item, wherein said postal security device includes means for generating a digital signature on the basis of constant data and only one variable data, said only one variable data being a fingerprint code extracted from said three-dimensional structure of the fibers of the mail item by means of said scanner device.

2. A postage meter according to claim 1, wherein said scanner device for scanning the three-dimensional structure of the fibers of each mail item is incorporated into said feeder module.

3. A postage meter according to claim 2, wherein said postal imprints include a two-dimensional bar code including said digital signature.

* * * * *